March 18, 1969   J. A. ALAI   3,433,435
TENSION STRING DRAG STRUCTURES FOR PLANETARY ENTRY VEHICLE
Filed July 25, 1966

INVENTOR:
JOHN A. ALAI,
BY
ATTORNEY 3,433,435
TENSION STRING DRAG STRUCTURES FOR
PLANETARY ENTRY VEHICLE
John A. Alai, Willingboro, N.J., assignor to General
Electric Company, a corporation of New York
Filed July 25, 1966, Ser. No. 567,608
U.S. Cl. 244—1                               25 Claims
Int. Cl. B64d *1/02, 17/00, 19/00*

ABSTRACT OF THE DISCLOSURE

A strong, lightweight, planetary entry drag structure comprises, as the primary load-bearing component, a plurality of filamentary elements under tension suspended between fore and aft structural members. A second plurality of such elements may be used to support the aft structural member. In a specific embodiment, the two termini or support points of each of the suspended filamentary elements are located in different meridional planes, i.e., the support points of each element are angularly displaced from one another, so as to enhance aerodynamic performance.

---

This invention relates to a strong, extremely lightweight, drag structure. Specifically, this invention relates to a structure, for use with a planetary entry or re-entry vehicle to provide the vehicle with a lightweight, strong, drag surface.

Deceleration of space vehicles from orbital or interplanetary velocities to practical observation or landing speeds in a planetary atmosphere is a difficult problem which has been given increasing consideration in recent years due to the tremendous increase in extra-terrestrial experimentation. Generally some type of mechanical propulsive force, such as reverse-mounted rockets, are used to initiate this deceleration. The tremendous speeds involved, however, require additional deceleration means and in some applications it is desirable to eliminate reverse-mounted deceleration rockets altogether.

In a planetary atmosphere, atmospheric resistance or drag may be used either as a primary or as a supplemental deceleration means. The use of this concept depends, for all practical purposes, on the presentation of a high cross-sectional area surface perpendicular to the vehicle's direction of travel to provide a braking or drag effect. Very large forces act upon such a surface because of the vehicle's high velocity and high strength in the drag surface is therefore required. The drag surface must also be lightweight to minimize the thrust necessary to initiate the flight of the vehicle with which the drag surface is associated and to provide a lower ballistic trajectory coefficient. This coefficient is a dimensionless number computed by dividing the weight of the structure by the product of the structure's drag coefficient and its projected area. The lighter weight, and resultant lowered ballistic trajectory coefficient, reduces the deceleration loading on the drag structure and also reduces the heating rate of the structure.

An approach to this problem, utilizing an element in tension as the main load-bearing component of a drag structure has previously been suggested. The load-bearing component, according to this suggestion, is a sheet or membrane shaped to form a drag surface having the proper aerodynamic characteristics. This design is called a tension shell. In the tension shell design the initial tension is dependent on a balance of inertial and deceleration forces in the vehicle with which the high-drag structure is associated. One disadvantage of such a structure is that it is operable only under these design conditions and minor variations are highly detrimental to the effectiveness of the structure. This imposes severe limitations on the practicability of the concept in view of the probability of in-flight variation in velocity, rate of deceleration, and angle of attack. The latter factor, which is a function of the angle between the drag surface and its direction of travel, would cause a change in the angle of incidence of the force on the drag surface, which would in turn produce a bending moment in the structure.

It is therefore an object of the present invention to provide a more practical, lightweight, high strength, drag structure.

It is a further object of this invention to provide such a lightweight structure which may be used under a wide range of loading conditions.

Still another object of the present invention is to provide a practical, high strength, lightweight, drag structure which may be used for the atmospheric deceleration of space vehicles or packages.

Briefly, these and other objects are met by a drag structure comprising, as its primary load-bearing component, a plurality of tension strings, suspended under tension between a smaller support means located near the front of the structure and a large support means located near the rear of the structure.

Although the specification concludes with claims clearly and distinctly pointing out the subject matter of the present invention, it is believed that the invention will be better understood from the following description taken in conjunction with the accompanying drawings, in which:

Figure 1:
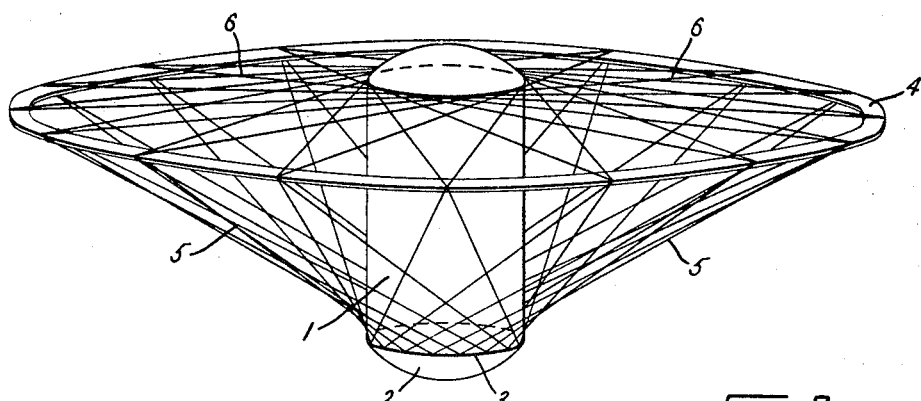
FIGURE 1 is a schematic illustration of one embodiment of the present invention.

Looking first to FIGURE 1, there is shown a main structural member 1 which may house a space vehicle, an instrument package, or some other payload. In addition to the main structural member 1 there is also a protective nose cap 2, which is a sphere sector in this embodiment, and a forward support means 3. The forward support means 3, which is circular in this embodiment, may be an integral part of the main structural member 1 or the protective nose cap 2. Aft support member 4, is also circular and is somewhat larger than the forward support means 3. A plurality of tension strings 5, each of which comprises a length or segment of a filamentary material, are suspended under tension between the forward and aft support means 3 and 4 to form the forebody of the structure.

A second plurality of tension strings 6, forming the afterbody of the structure, extend between aft support means 4 and an aft portion of the main structure member 1, which acts as an additional support means, to hold the aft support means 4 in spaced relationship from the forward support means 3. The afterbody tension strings 6 also counteract the bending moment on the aft support means 4 caused by the forebody tension strings. Both pluralities of tenstion strings 5 and 6 may be secured or bonded to the various support means at the support points or termini of each tension string.

Each of the tension strings, in the pluralities of tension strings 5 and 6, has one of its termini or support points in one meridional plane and the other of its termini or support points in a different meridional plane. For purposes of this description, meridional planes are the series of imaginary planes containing the structure's axis line, which is the line between the center points of the forward and aft support means 3 and 4 of the structure. The angular displacement between the meridional planes containing the two support points of a given tension string is called the twist angle of that tension string. In the structure shown in FIGURE 1, the twist angle is approximately 45°. The geometric array formed by the tension strings forms a truncated hyperboloid of revolution.

The structure illustrated in FIGURE 1 may be made by winding a single filament, under tension, from the froward support means to the aft support means, to the aft portion of the main structural member 1, back to the aft support means 4 and to the forward support means 3. This operation is repeated, using a single continuous filament, until a sufficient number of tension strings have been wound onto the structure. Although friction alone may suffice to hold all of the tension strings in place, it is preferred that they be secured or bonded to each of the support points on support means 3 and 4 and the aft portion of main structural member 1 by some convenient means such as a chemical adhesive or a mechanical clamp.

Figure 2:
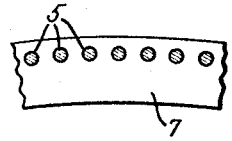
FIGURE 2 is a partial cross-section of a reinforced drag surface which may be used in accordance with one aspect of the present invention.

In order to protect the tension strings in this structure from the adverse effects created by planetary entry conditions, such as atmospheric friction heating, the plurality of tension strings 5 may be coated with a protective material, such as a silicone. A partial cross-section of a structural surface formed in this manner may be seen in FIGURE 2 in which the tension strings 5 are seen in cross-section. The tension strings 5 form a reinforcement or substrate for the coating material 7. As another alternative, the coating material may be applied to the filamentary material before or as it is wound onto the structure so that the coating material on the respective tension strings may coalesce into a unitary coating on the drag surface. The coating material may be applied by spraying, dipping, painting, or in some other convenient manner. Materials other than silicones may also be useful as the protective coating. Although not necessary, a certain amount of resiliency in the protective material is desirable to distribute any force on the structure to the tension strings in the general area where the force is applied.

Figure 3:
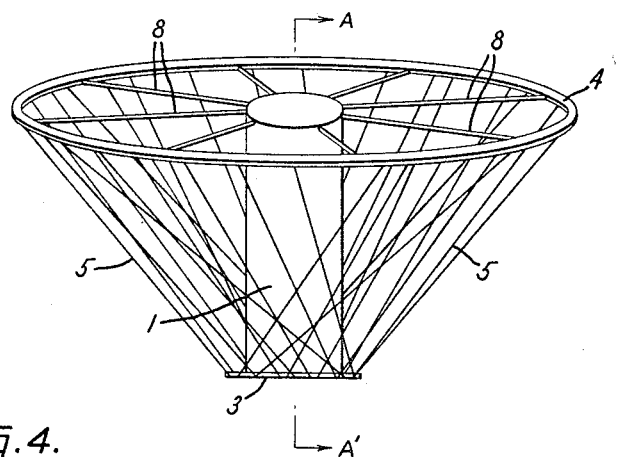
FIGURE 3 is a schematic illustration of another embodiment of the present invention.
Figure 4:
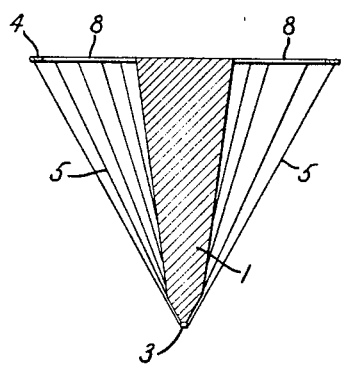
FIGURE 4 is a cross-sectional view of the embodiment of the invention shown in FIGURE 3.

In FIGURE 3 is shown an embodiment of the present invention known as the chisel point. In this embodiment, forward support means 3 defines a linear segment or very narrow rectangle. A plurality of tension strings 5 extend from either side of the forward support means 3 to an elliptically shaped aft support means 4 with the respective termini of each tension string lying in different meridional planes. In addition, stiff members 8 form a rigid support between the aft support means 4 and the main structural member 1 to hold the aft and forward support means in spaced relationship. It will be noted that the main structural member 1 in this embodiment is shaped to conform to the configuration of the surface generated by the plurality of tension strings 5. This may be better seen by referring to FIGURE 4, which is a cross-sectional view, on the plane AA', of the structure shown in FIGURE 3.

In FIGURES 1 and 3, the number of tension strings in the respective pluralities of tension strings is limited for purposes of clarity in the illustration. Obviously more tension strings than are shown would be required for the tension strings to function as the primary load-bearing components of an effective drag structure.

Various modifications of the embodiments illustrated may be made. For example, a second plurality of tension strings could be used in the embodiment shown in FIGURE 3 in lieu of the stiff members 8. Similarly, the aft support means 4 shown in FIGURE 3 may be circular rather than elliptical. Conversely, the circular forward and aft support means 3 and 4 shown in FIGURE 1 may be elliptical or in fact any of a great variety of other shapes. Simple closed planar shapes generally seem to be the most practical.

In use, the structures of the present invention provide an extremely lightweight, strong, and effective drag surface. Three primary functional features of the structures taught in the present invention are: (1) the incidence of a compressive force, such as drag, on the drag surface causes a tensile force in the load-bearing elements of the structure, namely the tension strings; (2) the load-bearing surface is both strong and light due to the use of filaments having high tensile strength as the main structural elements; and (3) the design of the structural arrangement is such that stress is quickly and evenly distributed throughout the structure. Stress distribution is accomplished by the reactive force of the aft support means on all the tension strings and by the interaction of all the strings at their various intersections.

A further feature of this invention is that a wide variety of aerodynamic characteristics, including low, intermediate, or high drag coefficients, are attainable in structures utilizing the present inventive concept. For example, if a sphere sector is used as the nose cap and the twist angle of the tension strings in the forebody is 0°, i.e., both termini of each tension string lie in the same meridional plane, the forebody will define a truncated cone and the overall drag structure will be that known as a sphere-cone. A similar structure having increased strength in the drag surface and a better ability to distribute stress throughout the drag surface is that in which the tension strings have a relatively small twist angle, i.e., from 0° to about 20°. In these designs, slightly higher drag coefficients, than those of the sphere-cone, are attained, but the aerodynamic characteristics generally are quite similar to those of the sphere-cone. The tension strings in these designs define truncated hyperboloids of revolution of relatively slight curvature. If the twist angle of the tension strings exceeds 20°, the truncated hyperboloid of revolution generated thereby will have greater curvature and different aerodynamic characteristics, including a higher drag coefficient, will be attained.

The advantages of the present invention may best be utilized by the judicious selection of materials for certain components of the structure. In particular, the tension strings should be a lightweight, heat-resistant filamentary material having high tensile strength and a high modulus of elasticity. One such material is fibre-glass. Other suitable materials include epoxy-coated fibre-glass, which has better abradability than ordinary fibre-glass, monofilament glass, which is known particularly for its high tensile strength; and some of the new carbon and boron filamentary materials, which are extremely strong and heat resistant. Other filamentary materials, including yarns, rovings, or monofilaments which have the desired properties may also be used.

Since the aft support means must be relatively rigid and resistant to buckling and at the same time have relatively low weight, it has been found that aluminum or titanium and the alloys of these metals are the preferred materials for forming this member. Beryllium and its alloys may also be used, as well as other types of materials, including for example, composite structural materials. In addition to manufacturability, high strength to weight and high stiffness to weight ratios are desirable attributes of the material selected for this purpose.

Other parts of the structures of the present invention may utilize any one of a great variety of materials depending on the particular design conditions and environment for which the overall structure is intended.

In some applications, it may be desirable to use an erectile or inflatable form of the present invention to permit stowage of the structure during initiation of the flight. This may be done by utilizing an inflatable or mechanically erectile member as the aft support means 4 or the main structural member 1. One way of manufacturing this form of the present invention is to assemble the structure, including its support members and tension strings in fully extended, i.e., inflated or erected, form and then to secure all of the tension strings at their respective termini. The rear support means 4 or the main structural support 1 is then collapsed and the entire structure is reduced to its stowed configuration. When ready for use, the structure is removed from its stowage compartment and the inflatable or erectile member is inflated or erected.

What I claim as new and desire to secure by Letters Patent of the United States is:

1. A lightweight, strong, drag structure comprising:
   (a) a main structural member,
   (b) a forward support means attached directly to said main structural member,
   (c) an aft support means, spaced from said forward support means,
   (d) a drag surface, said surface comprising a plurality of segments of filamentary material in tension, each of said segments extending from said forward support means to said aft support means, and
   (e) said aft support means attached indirectly to said main structural member through a second plurality of filamentary segments under tension.

2. A lightweight, strong, drag structure, as recited in claim 1, wherein the point of contact of any one of said filamentary segments with said forward support lies in one meridional plane and the point of contact of the same filamentary segment with said aft support means lies in a second meridional plane.

3. A lightweight, strong, drag structure, as recited in claim 1, wherein said forward support means defines a linear segment.

4. A lightweight, strong, drag structure, as recited in claim 1, wherein said forward support means defines any simple enclosed planar shape.

5. A lightweight, strong, drag structure, as recited in claim 1, wherein said forward support means defines a circle.

6. A lightweight, strong, drag structure, as recited in claim 1, wherein said forward support means defines an ellipse.

7. A lightweight, strong, drag structure, as recited in claim 1, wherein said aft support means defines any simple enclosed planar shape.

8. A lightweight, strong, drag structure, as recited in claim 1, wherein said aft support means defines a circle.

9. A lightweight, strong, drag structure, as recited in claim 1, wherein said aft support means defines an ellipse.

10. A lightweight, strong, drag structure, as recited in claim 1, wherein said forward support means is spaced from said aft support means by the attachment of both to said main structural member.

11. A leightweight, strong, drag structure, as recited in claim 1, wherein said filamentary segments are comprised of fibre-glass.

12. A lightweight, strong, drag structure, as recited in claim 1, wherein said filamentary segments are comprised of epoxy-coated fibre-glass.

13. A lightweight, strong, drag structure, as recited in claim 1, wherein said filamentary segments are comprised of monofilament glass.

14. A lightweight, strong, drag structure, as recited in claim 1, wherein said filamentary segments are comprised of filamentary carbon.

15. A lightweight, strong, drag structure, as recited in claim 1, wherein said filamentary segments are comprised of filamentary boron.

16. A lightweight, strong, drag structure, as recited in claim 1, wherein said aft support means is comprised of aluminum.

17. A lightweight, strong, drag structure, as recited in claim 1, wherein said aft support means is comprised of an aluminum alloy.

18. A lightweight, strong, drag structure, as recited in claim 1, wherein said aft support means is comprised of titanium.

19. A lightweight, strong, drag structure, as recited in claim 1, wherein said aft support means is comprised of a titanium alloy.

20. A lightweight, strong, drag structure, as recited in claim 1, wherein said aft support means is comprised of beryllium.

21. A lightweight, strong, drag structure, as recited in claim 1, wherein said aft support means is comprised of a beryllium alloy.

22. A lightweight, strong, drag structure, as recited in claim 1, wherein said aft support means is collapsible.

23. A lightweight, strong, drag structure, as recited in claim 1, wherein said main structural member is collapsible.

24. A lightweight, strong, drag structure, as recited in claim 1, wherein said plurality of filamentary segments are coated with a protective material to produce a smooth surface having a geometry approximating that generated by the plurality of stretched filamentary segments.

25. A lightweight, strong, drag structure, as recited in claim 24, wherein said coating comprises a silicone.

References Cited

UNITED STATES PATENTS

| | | | |
|---|---|---|---|
| 1,840,618 | 1/1932 | Castner | 244—146 |
| 2,520,533 | 8/1950 | Dawes | 244—145 |
| 2,823,881 | 2/1958 | Patterson | 244—113 X |

FERGUS S. MIDDLETON, *Primary Examiner.*

U.S. Cl. X.R.

244—138